United States Patent [19]

Ratigan

[11] Patent Number: 5,441,790
[45] Date of Patent: Aug. 15, 1995

[54] ROPE ABRASION PROTECTION DEVICE

[76] Inventor: Edward Ratigan, P.O. Box 114, APO AP 96555, Marshall Islands

[21] Appl. No.: 18,154
[22] Filed: Feb. 16, 1993
[51] Int. Cl.⁶ .............................................. B32B 3/06
[52] U.S. Cl. ................................. 428/100; 428/36.1; 428/192; 428/193
[58] Field of Search ............... 428/100, 36.1, 192, 428/193

[56] References Cited

U.S. PATENT DOCUMENTS

| | | | |
|---|---|---|---|
| 3,370,818 | 2/1968 | Perr | 428/100 X |
| 3,404,051 | 10/1968 | Hall | 428/57 X |
| 3,867,188 | 2/1975 | Campbell et al. | 428/290 |
| 4,706,914 | 11/1987 | Ground | 428/100 X |
| 5,178,923 | 1/1993 | Andrieu et al. | 428/100 X |
| 5,200,245 | 4/1993 | Brodrick, Jr. | 428/100 |

Primary Examiner—Henry F. Epstein
Attorney, Agent, or Firm—Rhodes, Coats & Bennett

[57] ABSTRACT

A synthetic rope abrasion protection device is provided. A piece of textile made of synthetic fibers like nylon, polypropylene, polyester, or acrylic fiber material used to protect synthetic rope. Means are provided to bind the protective material to the rope. VELCRO strips permanently attached to the latex mat backing prevent rope slippage and are used to prevent the protective device from unraveling. The protective device can remain in place when rope is being fed through a block (i.e., pulley) or turned on a winch or a capstan. The protective device can be installed on an eye-splice without undoing the splice.

7 Claims, 1 Drawing Sheet

FIG. 1
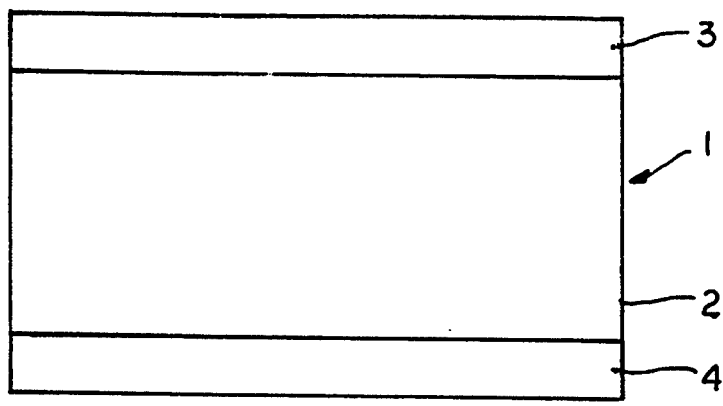
FIG. 2
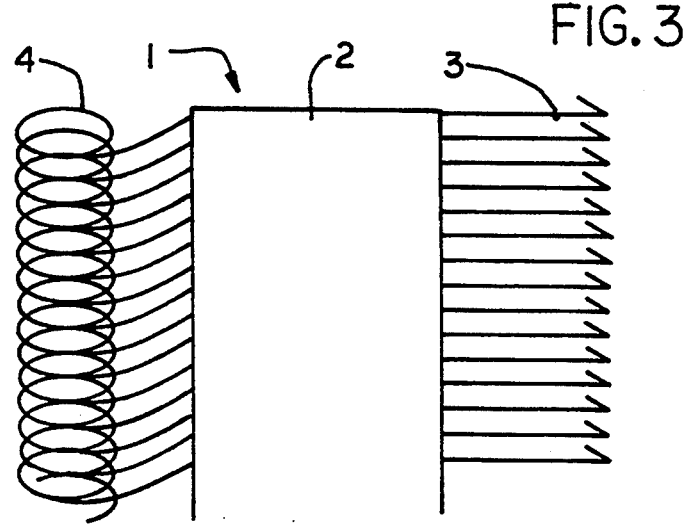
FIG. 3
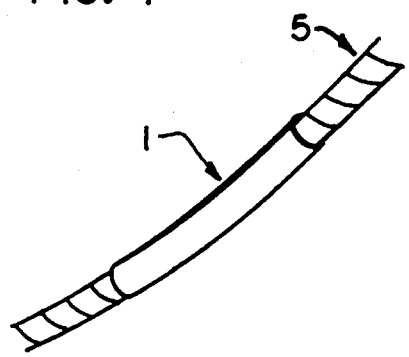
FIG. 4

ROPE ABRASION PROTECTION DEVICE

BACKGROUND AND SUMMARY OF THE INVENTION

This invention relates to the protection of synthetic rope from abrasion, more specifically chafe abrasion of synthetic marine mooring and anchor rope. The use of conventional chafe protection devices have several disadvantages:

1. Hose style chafe protection devices require the rope to be inserted into the hose and then slid into position at the chafe point. This requires the rope to be detached from its securing position.
2. Some chafing devices are permanently secured to synthetic rope by stitching a protective sacrificial covering to the rope at the chafe point. This method limits the protection of the rope to a permanent configuration. In addition, the stitches are detrimental to the longevity of the rope fibers.
3. Some chafing devices require the use of lacing lines to secure the protective material to;the rope at the chafe point. Lacing lines often foul and break, thereby permitting the chafing device to slide out of position from the chafe point.
4. Some chafing devices require the protective material to be placed on rope with securing tabs aligned in a specific orientation. The orientation prevents the separation of the protective material from the rope while in use. Rope under tension, or in dynamic use, will often shift in axial orientation. A shift can cause a misalignment, thereby permitting the chafing device to slide out of position from the chafe point.
5. Hose type chafing devices can not be placed within an eye-splice without undoing the splice and then re-splicing.
6. Conventional chafe protection devices often severely limit the bending radii of the rope being protected.
7. Conventional chafe protection devices can not feed through blocks (i.e., pulleys), because of interference from lacing lines and or limiting bending radii.
8. Conventional chafe protection devices can not be used on rope being turned on a winch or a capstan because of rope slippage and/or limiting bending radii.
9. Conventional tube type chafe protection devices placed on fixtures such as shroud turnbuckles require the release the shroud from its securing position prior to installation.

The present invention solves these disadvantages by the application of a protective device which binds to rope by its own means. In the application of the protective device, the rope need not be removed from its securing position. In addition, the protective device is easily installed and removed and does not become a permanent member of the rope. The device may be placed within an eye-splice without undoing the splice. The bend radius of the rope is only partially limited by the application of the protective device. Because the protective device binds to the rope, it will not hinder rope running through a block (i.e., pulley) or from being turned on a winch or a capstan. Additionally, the protective device can be installed around standing rigging fixtures, such as shroud turnbuckles, without detaching the rigging from its securing position.

My chafe protection device consists of a piece of textile material made of synthetic fiber, like nylon, or polypropylene, or polyester, or acrylic. The dimensions and shape of the material are unspecified as they are a function of the rope size to be protected. Strips of VELCRO hooks are permanently attached on the latex mat side of the material along the lengths of the two opposite longest borders.

The chafe protection device is attached by hand-wrapping the device tightly around the rope to be protected. The wrapping procedure is done in such a manner that one of the two lengths of VELCRO hooks binds with the rope during the wrapping process. The remaining line of hooks binds to the fiber of the device, thus preventing the unraveling of the protective device. In the case of its application to standing rigging fittings, the device is hand-wrapped around fittings and held in position by the hooks binding to the fiber of the device.

The device is removed from the rope by hand unwrapping.

Accordingly, a principal object of the invention is to provide new and improved means to prevent chafe abrasion of synthetic rope.

Another object of the invention is to provide a new and improved chafe abrasion protective means having means to be installed on a rope without removing the rope from its in-place securing position.

Another object of the invention is to provide a new and improved chafe protective means which can be attached to a rope without the use of lacing or securing lines.

Another object of the invention is to provide a new and improved chafe protective means which can be attached to an eye-splice without undoing the splice.

Another object of the invention is to provide a new and improved chafe protective means having means to prevent the chafe protection material from sliding from its protective position.

Another object of the invention is to provide a new and improved chafe protective means having means to remain on the rope while the rope is passing through a block or being turned on a winch or capstan.

Another object of the invention is to provide a new chafe protective means having means to protect running fiber rigging and sails from chafing on standing rigging fittings.

BRIEF DESCRIPTION OF THE DRAWINGS

These and other objects of the invention will be apparent from the following specification and drawings of which:

FIG. 1 is a bottom plane detail view of the invention.

FIG. 2 is a side detail longitudinal view of the invention.

FIG. 3 is an enlarged detail view showing sections 1, 2, 3, and 4 of the invention.

FIG. 4 is a view of the invention as applied to a rope 5.

Referring to FIGS. 1, 2, and 3, the invention comprises a section of material, consisting of synthetic fiber material on one side 1 and latex mat backing on the reverse side 2. Permanently attached to the longitudinal borders of the latex mat surface material 2 are continuous strips of VELCRO hooks 3 and 4.

DETAILED DESCRIPTION OF THE DRAWINGS

To cover a rope with the protective device, either of the longitudinal strips, 3 or 4, are placed on and in longitudinal alignment with the rope 5. The protective material is then wrapped tightly by hand around the rope. A completed wrap is presented in FIG. 4. Unraveling of the protective device from the rope is prevented by the remaining longitudinal strip of VELCRO hooks, 3 or 4 which bind with the fiber material 1 of the protective device.

Slippage of the protective material along the rope is prevented by the VELCRO hooks 3 which bind with the rope's fibrous composition.

The hook strips 3 and 4 may be attached to the latex mat surface of the protective material in other, or additional, configurations.

I claim:

1. A rope abrasion protection device comprising a flexible sheet material having two sides, a synthetic fiber material on one side and a backing on a reverse side, said device having two opposite borders, and hooks along said borders on the side having said backing.

2. The rope abrasion protection device of claim 1, wherein said synthetic fiber is selected from the group consisting of nylon, polypropylene, polyester and acrylic fiber.

3. The rope abrasion protection device of claim 1, wherein said hooks are VELCRO hooks.

4. A device for protecting a rope from abrasion comprising a textile material having two surfaces, a synthetic fiber material on one surface and a latex mat finish on a reverse surface, said device having two opposed borders, and hooks along said borders on said reverse surface.

5. The rope abrasion protection device of claim 4, wherein said synthetic fiber is selected from the group consisting of nylon, polypropylene, polyester and acrylic fiber.

6. The rope abrasion protection device of claim 4, wherein said hooks are VELCRO hooks.

7. A chafe-protected rope comprising
   a fibrous rope and
   a flexible sheet material having two sides, a synthetic fiber material on one side and a mat backing on a reverse side, said sheet having a two opposed borders and hooks along said borders on said side having said mat backing,
   said sheet material being wrapped around said rope such that hooks in one of said borders engage fibers of said rope, with said sheet being wrapped around the rope to put said mat backing into opposed, contacting relation to said rope and said hooks of the other of said borders engaging said synthetic fiber material on said one side to hold said sheet wrapped around said rope.

* * * * *